Jan. 23, 1951 E. H. SHAFF 2,538,919
ADAPTER
Filed June 3, 1944
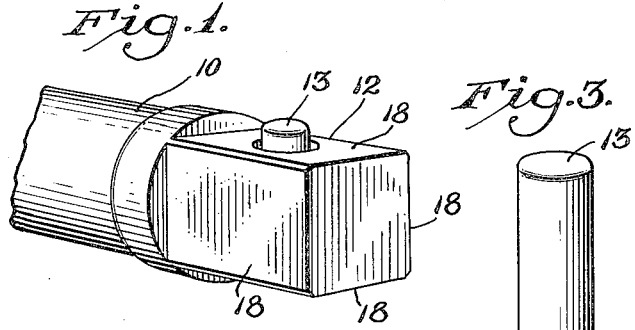
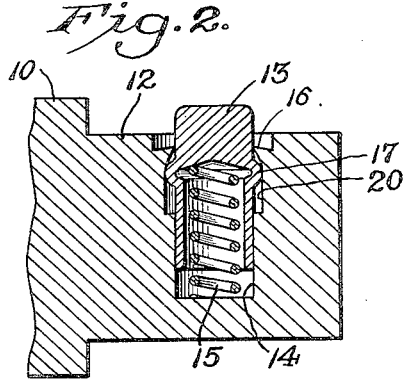
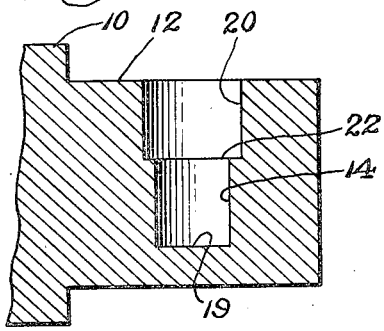
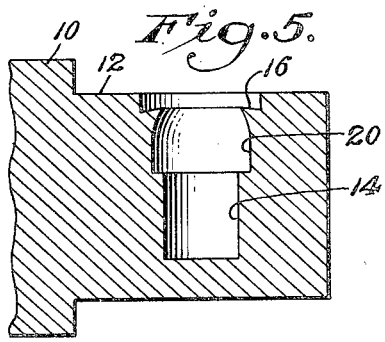
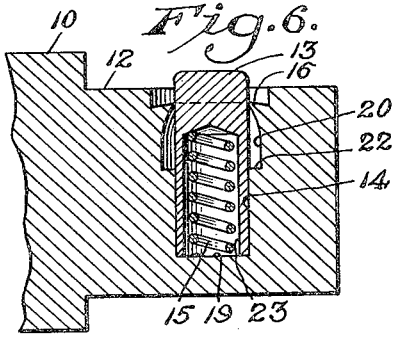
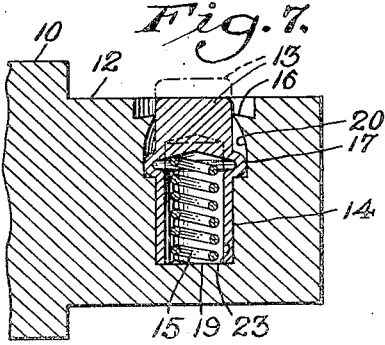
Inventor
Ernest H. Shaff
BY
Carlsen, Pitzner, Hubbard & Wolfe.
Attorneys.

Patented Jan. 23, 1951

2,538,919

UNITED STATES PATENT OFFICE 2,538,919

ADAPTER

Ernest H. Shaff, Spring Lake, Mich., assignor to Keller Tool Company, Grand Haven, Mich., a corporation of Michigan Application June 3, 1944, Serial No. 538,605

6 Claims. (Cl. 287—119)

This invention relates to adapters, and more particularly to adapters of the type utilized for releasably latching and connecting together two parts such as the driving and driven elements of tools, drives or other mechanisms.

A general object of this invention is to provide an improved socket adapter which includes a releasable latching detent and which, although relatively simple in structure and easily manufactured, is very durable and free of trouble in service.

Another object of this invention is to provide an improved socket adapter including a releasable latching detent and having the parts thereof constructed and arranged for ease and simplicity of assembly and the avoidance of small separate parts which might become loose or lost in service.

An additional object of this invention is to provide an adapter including a spring biased latching detent and retaining means for limiting movement of the detent, and in which the parts are constructed and arranged for integral formation of the retaining means during assembly.

Still another object of this invention is to provide an adapter of the type referred to in which the parts subjected to wear and stress may be hardened at appropriate stages of the manufacture without injuring or changing the other parts thereof.

Other objects and advantages of the invention will become apparent from the following description, taken in connection with the accompanying drawings, in which:

Figure 1 is a fragmentary perspective view of an adapter embodying a preferred form of this invention.

Fig. 2 is a longitudinal sectional view of the completed assembly of the apparatus shown in Fig. 1.

Fig. 3 is a perspective view of a part of the apparatus shown in Figs. 1 and 2.

Figs. 4, 5, 6, and 7 are longitudinal sectional views showing various steps in the manufacture and assembly of the apparatus shown in Figs. 1 and 2.

While the invention is susceptible of various modifications and alternative constructions, I have shown in the drawings and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, this invention is shown in its application to an adapter for a tool driving spindle such as the spindle of a portable power driven tool. In general it comprises a member 10 having a shank portion 12 in which a detent 13 is mounted for transverse movement in a bore or socket 14 having a circumferential recess intermediate its ends for the accommodation of a stop flange or bead formed on the detent. The latter is biased outwardly by a compression spring 15. Through the construction comprehended by this invention, an adapter is provided which is not only made by inexpensive processes to avoid small and easily loosened or lost parts, but which also permits hardening of the parts subject to wear. To this end outward movement of the detent 13 produced by the compression spring is limited by a rim 16 integrally formed on the shank portion 12 adjacent the bore and adapted to coact with the integral outwardly extending flange or bead 17 on the detent 13. The wear resisting parts are separately hardened prior to assembly in a manner which does not prevent successive assembly operations.

Considered in more detail, the member or shaft 10 may comprise a driving or driven part of a power driven tool, such as a wrench, screw driver or chisel, or may be a shaft which is to be connected in driving or driven relation to a detachable cooperating shaft or member. Thus, the shank portion 12 of the shaft 10 has flat angularly disposed sides 18 and is adapted to fit into a socket of an adjoining shaft or member (not shown), and to be releasably secured in said socket by the detent 13, said detent being adapted to fit into a recess or opening in a wall of the socket.

The socket or bore 14 in the side of the shank portion 12 is of a size such that the detent 13 fits therein for sliding movement and desirably has a flat bottom 19 which provides an abutment for the inner end of the detent. In the exemplary tool, the recess for the bead 17 is formed by a counterbore 20 concentric with the socket or bore 14 which provides a shoulder or abutment 22 between the bottom 19 of the bore 14 and the open end of the counterbore 20, as shown in Fig. 4. The shank portion 12 is swaged inwardly adjacent the open end of the counterbore 20 to form the integral rim 16 at the open end of the counterbore thus providing a shoulder or abutment at the other end of the recess in opposed relation to the shoulder 22. The inside diameter of the rim 16 is substantially the same as that of the bore 14 so that the detent 13 extends therethrough and is slidable therein, as shown in Figs. 5 and 6.

The detent 13 may be made from round bar stock of suitable diameter and finish and has an axial bore 23 extending inwardly from the bottom end thereof to a depth which is preferably somewhat greater than the depth of the bore 14 between the shoulder 22 and the bottom 19 of that bore, as shown in Fig. 6. The spring 15 is mounted in the bore 23 of the detent 13 between the end of that bore and the bottom 19 of the socket or bore 14, and is normally compressed to bias the detent outwardly.

After the installation of the spring 15 and detent 13 in the bore 14, as shown in Fig. 6, pressure is applied to the projecting end of the detent 13 either in a press or by striking that end of the detent to deform the intermediate portion of the detent and form thereon the integral flange or bead 17. The socket or bore 14 supports the major portion of the thin walled section of the detent, and shoulder 22 serves as an anvil for the deformation of the detent and the formation of the integral bead or flange. The flat bottom 19 of the bore 14 furnishes an abutment for the inner end of the detent which does not tend to deform that end during the application of pressure. The purpose of extending the bore 23 into the detent to a depth greater than the distance between the bottom 19 of the bore 14 and the shoulder 22 is to provide a thin walled section in the detent 13 which extends beyond the bore 14 and is adapted to be deformed by expansion into the recess formed by the counterbore 20 adjacent the shoulder 22 upon the application of pressure to the end of the detent, as shown in Fig. 7.

The integral flange or bead 17, which is formed by the described deformation of the detent 13, is slidable in the recess formed by the counterbore 20 and is adapted to engage the rim 16 to limit the outward movement of the detent 13 which is effected by the biasing force of the spring 15, as shown in Fig. 2. The length of the detent 13 prior to the deformation which forms the integral flange 17, is preferably such that after the said deformation, the normally projecting end of the detent is substantially flush with the surface 18 of the shank portion 12 when the other end of the detent engages the bottom 19 of the bore 14.

After drilling the shank portion 12 to provide the bore 14 and counterbore 20, and after the swaging of the shank portion adjacent the counterbore 20 to provide the integral rim 16, the shank and other portions of the member or shaft 10 may be suitably hardened by any desired process to withstand wear and long service. Also, after the finishing and drilling of the detent 13, that part may be hardened, as by cyanide hardening, to provide a thin hardened case thereon which will not interfere with the deformation of the detent which forms the integral bead 17, but which will contribute improved wearing qualities to the detent.

It is a feature of this preferred embodiment of the invention that the parts, such as the shank portion 12 and the detent 13, may be separately hardened by suitable processes to improve their wearing qualities in service. The separate hardening of the parts permits the use of a suitable or desired hardening process on each of the parts and it prevents either hardening process from changing the characteristics of another part, such as the spring 15.

The feature of separately hardening the parts supplements the important feature of integrally forming those parts by relatively simple and inexpensive processes during the assembly to effect the production of a resultant structure which is not only durable, but has no small or separable parts such as retainers which may become loose or lost in service.

I claim as my invention:

1. An adapter in which a shank portion of one member is adapted to fit into a cooperating holder of another member and comprising, in combination, a member having a shank portion, said shank portion having a socket extending partially therethrough so as to have a bottom, a counterbore concentric with respect to said socket and having a depth less than the depth of said socket to provide a shoulder adjacent the socket, said shank portion being swaged inwardly adjacent the edge of said counterbore to provide an integral rim spaced from said shoulder and having an inner diameter approximately equal to the diameter of said socket, a detent slidably fitting into said socket to a depth such that the end thereof is flush wih said shank portion, said detent having an inwardly opening longitudinal bore, a compression spring disposed in said longitudinal bore between the detent and the bottom of said socket and urging the detent outwardly of said socket, and an integral flange on the outer surface of the detent slidable in said counterbore between said shoulder and said rim, said rim and flange limiting outward movement of the detent.

2. A connecting device for tools and the like comprising, in combination, a member formed with a flat side and having a cylindrical bore opening in said side, said bore having a circumferential recess intermediate its ends, a cylindrical plunger dimensioned to slidably fit said bore, a spring interposed between said plunger and the bottom of said bore yieldably urging the plunger outwardly from the bore, and an integral circumferential flange formed on said plunger disposed within said recess, said recess defining opposed spaced abutments engageable by said flange to limit the range of movement of said plunger.

3. A connecting device for tools and the like comprising, in combination, a member formed with a flat side and having a cylindrical bore opening in said side, said bore having a circumferential recess intermediate its ends, a cylindrical plunger dimensioned to slidably fit said bore, a spring interposed between said plunger and the bottom of said bore yieldably urging the plunger outwardly from the bore, and a circumferential flange of greater diameter than said bore formed on said plunger within said recess operative to limit the extent of outward movement of the plunger, said flange being spaced from the outer end of the plunger so as to permit the end to be projected beyond the surface of said member by the action of said spring.

4. An adapter for tools comprising, in combination, a member formed with a flat side having a cylindrical bore opening therein, said bore having a circumferential recess intermediate its ends defining opposed spaced abutments, a cylindrical plunger dimensioned to slidably fit said bore, said plunger having a thin walled tubular inner end portion with a section of the wall shaped to form an outwardly projecting circumferential flange disposed within said recess for cooperation with said abutments to limit the range of movement of the plunger within said bore, and a spring interposed between said plunger and the bottom of said bore, said flange being spaced from the outer end of said plunger so as to allow the same to be projected substantially beyond the surface of said member by the action of said spring.

5. An adapter for tools comprising, in combination, a member formed with a side having a cylindrical bore opening therein, said bore having a circumferential recess intermediate its ends, a cylindrical detent dimensioned to slidably fit said bore, said detent having a hardened solid outer end portion and a tubular inner end portion, said inner end portion having a thin cylindrical wall shaped to form a circumferential bead of greater diameter than said bore and disposed within and slidable axially of said recess, a spring interposed between said detent and the bottom of said bore yieldably urging the detent outwardly from the bore, said detent being retained in said bore by said bead.

6. An adapter for tools comprising, in combination, a member formed with a flat side surface having a stepped cylindrical bore opening therein, an integral hardened rim extending around the mouth of said bore and having an internal diameter substantially equal to the smaller diameter of the bore, a hardened cylindrical detent dimensioned for a sliding fit with said rim and with the small diameter portion of said bore, said detent being formed with a tubular inner end portion providing a relatively thin wall having a narrow outward bulge defining a circumferential bead of greater diameter than said rim, and a spring interposed between said detent and the bottom of said bore operative to urge the detent outwardly to the extent permitted by engagement of said bead with said rim, said bead being spaced from the outer end of said detent so as to allow the end to project beyond the surface of said member.

ERNEST H. SHAFF.

REFERENCES CITED

The following references are of record in the file of this patent:

UNITED STATES PATENTS

| Number | Name | Date |
|---|---|---|
| 389,335 | Spear | Sept. 11, 1888 |
| 1,255,195 | Malby | Feb. 5, 1918 |
| 1,919,860 | Reutter | July 25, 1933 |
| 1,965,917 | Anderholm | July 10, 1934 |
| 2,138,404 | Haas | Nov. 29, 1938 |
| 2,190,081 | Pfauser | Feb. 13, 1940 |
| 2,216,873 | Densmore | Oct. 8, 1940 |